May 4, 1965

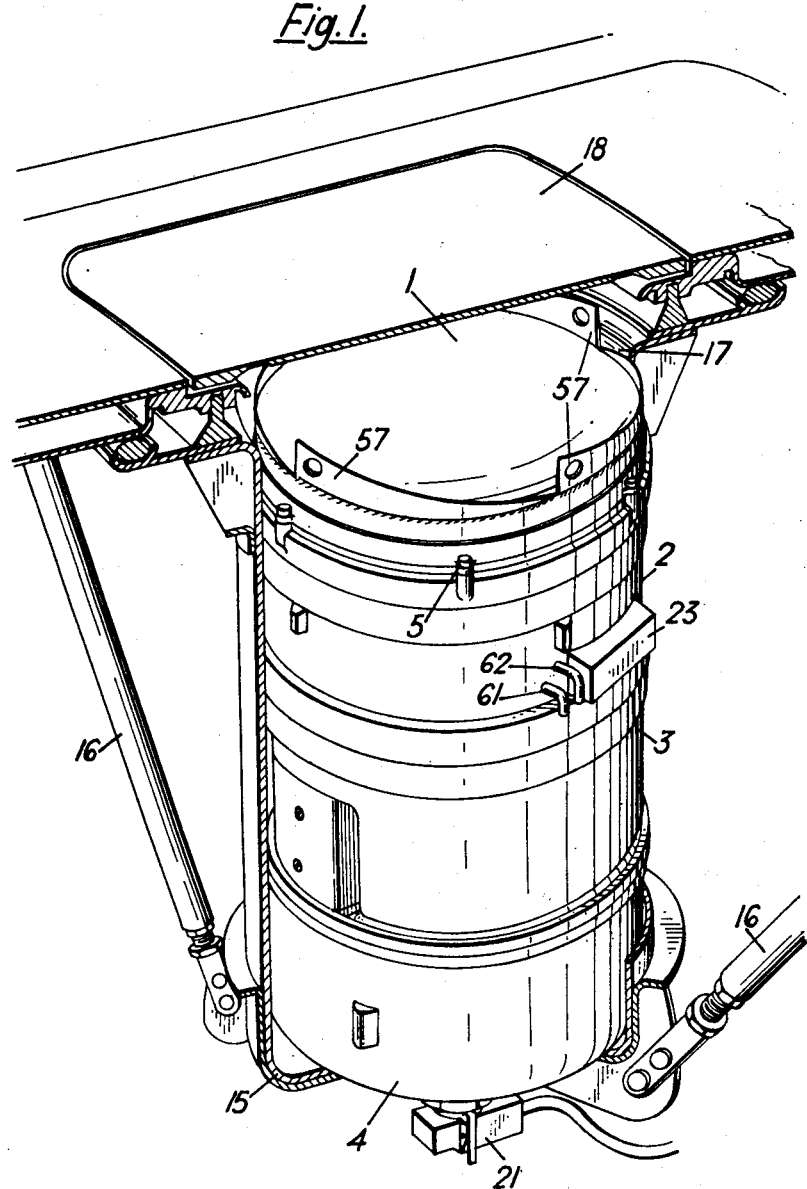

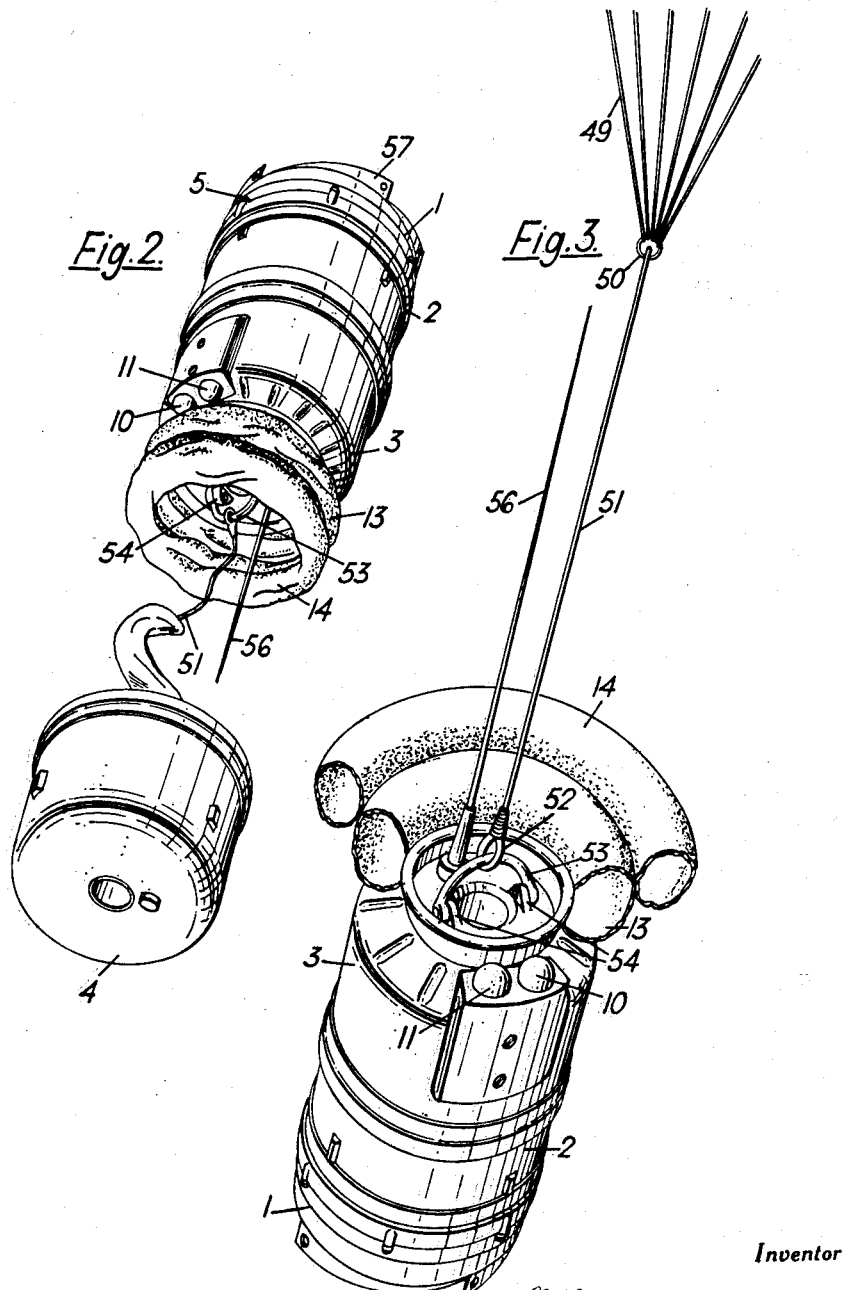

M. J. O. LOBELLE 3,181,809

AIRCRAFT CRASH RECORDER UNIT

Filed July 29, 1963

Inventor

MARCEL JULES ODILON LOBELLE

By

Kenyon, Kenyon, Stewart & Estabrook
Attorney

United States Patent Office 3,181,809
Patented May 4, 1965

3,181,809
AIRCRAFT CRASH RECORDER UNIT
Marcel Jules Odilon Lobelle, Slough, England, assignor to M. L. Aviation Company Limited, Slough, England, a British company
Filed July 29, 1963, Ser. No. 298,224
Claims priority, application Great Britain, Aug. 2, 1962, 29,766/62
5 Claims. (Cl. 244—1)

This invention relates to aircraft crash recorder units, apparatus used to obtain as much information as possible about the circumstances of an aircraft crash. These units include a recorder in the aircraft which records continuously such factors as the readings of important instruments, control settings and conversations between members of the crew. After a short time interval, for example, 10 minutes, these recordings are continuously erased and the result is that at any instant a record is provided of these factors over the preceding 10 minutes. Accordingly, in the event of a crash the recorder provides evidence of the variation of these factors over the period immediately preceding the crash. It is, of course, vital that the recorder itself, or at least the record produced by it, should survive the crash and therefore it is automatically jettisoned from the aircraft when this gets into difficulties. To effect this the crash recorder unit may be fired from a cylinder carried by the aircraft under the effect of an explosive charge which may be detonated under any given set of circumstances. When the recorder unit has been ejected in this way it is important that it should land safely, if the aircraft is in the air, and that it should be recovered without difficulty.

According to the present invention an aircraft crash recorder unit comprises a recorder housed within a canister including a time delay mechanism initiated by ejection from the aircraft, a parachute having a release linked to the delay mechanism, a flotation bag connected to a source of compressed gas, the release of gas from which is controlled by a member linked to the delay mechanism, and a radio transmitter controlled by a switch linked to the delay mechanism, the linkages being such that when the delay is completed the parachute is deployed, the flotation bag inflated and the radio transmitter switched on.

The time delay mechanism ensures that these three operations are not carried out until the canister is well clear of the aircraft and, if the ejection is carried out at high speed, that the parachute is not deployed until the speed has dropped to a level such that the parachute can open without being damaged.

Deployment of the parachute of course ensures that the recorder unit falls safely to earth if it is ejected during flight. The inflation of the flotation bag ensures that the canister will not sink if it falls in water, and the transmitter provides the necessary identification signals to assist in location of the unit.

As a further aid to recovery the flotation bag can carry a soluble bag or bags containing sea marker dye which will stain the water surrounding the canister.

The time delay mechanism is preferably in the form of a delay cartridge which is fired by the force of the ejection. After the predetermined delay to which the cartridge is set, for example 2½ seconds, this cartridge then explodes, the force of the explosion moving all the members necessary to carry out the three operations already referred to.

A crash recorder unit according to the invention will now be described in more detail, by way of example, with reference to the accompanying drawings in which:

FIGURE 1 is a side elevation of the unit in position in the aircraft;

FIGURE 2 is a perspective view of the unit after ejection from the aircraft;

FIGURE 3 is a perspective view showing the unit at a later time after ejection than does FIGURE 2.

Figure 4:
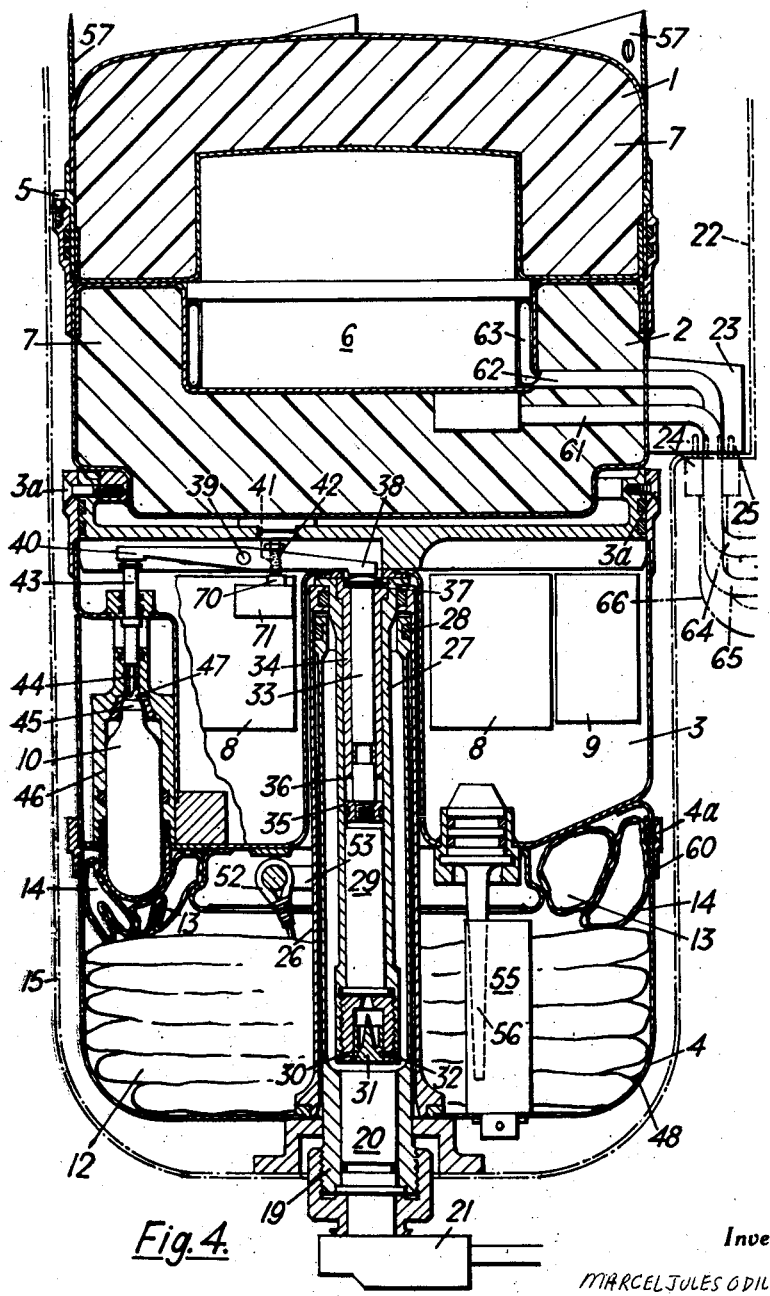
FIGURE 4 is a sectional view through the unit when in position in the aircraft.

The unit is made up of a canister comprising four sections, a first section 1, a second section 2, a third section 3 and a fourth section 4 forming a removable cover. The first two sections are bolted together by bolts such as 5 and each have a hollow centre portion defining a compartment 6 in which is housed the recorder. Each of these two sections is packed with fire-proof and crash-proof insulation 7 so that the recorder in the compartment 6 will not be damaged when the unit strikes the ground. The third section 3 is fixed to the second one by access screws 3a and houses a radio transmitter 8 and batteries 9 for this, and also two bottles 10 and 11 of compressed gas. The fourth section 4 is connected to the third section 3 by a series of access screws 4a and by shearable rivets 60, and this fourth section houses a parachute 12 and two flotation bags 13 and 14, the outer one 14, of which carries soluble bags containing sea marker dye. The ejection mechanism, which will be described later, projects upwardly through the centre of the third and fourth sections.

When in position in the aircraft the canister is held within a cylinder 15 firmly secured within the aircraft by struts such as 16 and having an open end 17 immediately below a frangible panel 18 in the skin of the aircraft. Fixed to the lower part of the cylinder 15 is a tube 19 in the bottom of which is housed a cartridge 20 connected to an electrical detonator 21 controlled from within the aircraft. One side of the cylinder 15 is formed with a guideway 22 for receiving a socket 23 and air pipes 61 and 62 on the side of the second section 2 of the canister. The socket 23 is electrically connected by leads (not shown) to the recorder and the air pipes 61 and 62 communicate with channels such as 63 surrounding the recorder so that cooling air may be circulated round the recorder from the aircraft system when the canister is in the aircraft. A plug 24 is fixed to the cylinder and has pins 25 which project upwardly through the cylinder and when the canister is in place mate with the socket 23. The pins of the plug are connected by a cable 66 to the instruments within the aircraft which are being recorded. Air inlet and outlet pipes 64 and 65 connected to the aircraft system are also fixed to the cylinder and mate with the pipes 61 and 62 when the canister is in place.

When the canister is inserted into the cylinder the tube 19 fixed to the cylinder projects upwardly into a tube 26 fixed to the fourth section 4 of the canister. The upper end of this tube 26 is closed and from it a further tube 27 projects downwardly into the space within the tube 19. The tube 19 carries a sealing ring 28 on its outer surface in contact with the tube 26. Within the lower part of the tube 27 there is housed a time delay cartridge 29 and below this an externally threaded insert 30 is screwed into the end of the tube to close this. The insert has fitted within it a firing pin 31 which is held in the position shown in FIGURE 4 by a shear wire 32. Above the delay cartridge 29 a plunger 33 fits within a sleeve 34 within the cylinder, the plunger having an enlarged lower end 35 which can abut against the end 36 of the sleeve 34. The plunger 33 has a mushroom shaped head 37 projecting from the cylinder into contact with one arm 38 of a lever pivoted at 39. The other arm 40 of this lever is forked and the front fork shown on the figure bears on one end of a rod 43, the other end of which carries a needle 44 arranged adjacent a seal 45 formed at the neck of the compressed gas bottle 10.

The bottle 11 has a similar rod arranged behind the first as seen in FIGURE 4, and the rear fork of the arm 40 bears on this rod. The bottles are fitted within a block 46 through which are formed passages (not shown) extending from the chamber 47 in which the needle 44 is positioned to the two flotation bags 13 and 14.

The arm 38 of the lever carries a threaded stud 41 projecting through it and capable of adjustment by a nut 42. The end of the stud bears on the operating member 70 of a microswitch 71 connected between the batteries 9 and the transmitter 8. The operating member is spring biased towards stud 41 which holds it from movement until the lever is moved about its pivot.

It has already been mentioned that the fourth section 4 of the canister houses the parachute 12, and the actual parachute is in fact enclosed in a cover one end of which is fixed at 48 to the inside of the section 4. The cords 49 of the parachute are fitted to a ring 50 anchored at the end of a wire 51 carrying at its other end a loop 52 which fits on a horseshoe shackle 53 hinged at 54 to the lower side of the third section 3 of the canister. The removable cover section 4 includes a part 55 covering a collapsible spring coiled aerial 56 for the transmitter 8. The aerial is biased by its spring coil form to an erect position but is restrained from erecting by the part 55.

When it is found necessary to eject the recorder unit an electrical impulse is applied to fire the cartridge 20. This impulse may be applied automatically by either inertia, immersion or heat sensitive swtches, or alternatively it may be operated manually by the pilot, or automatically by the ejection seat of the pilot leaving the aircraft. When the cartridge 20 is fired the gas pressure formed in the space between the tubes 19 and 27 firstly breaks the shear wires 32 and moves the firing pin 31 into contact with the time delay cartridge 29 to start this burning. The gas pressure then acts on the whole of the end of the tube 27 and on the part joining the two tubes 26 and 27 to force the canister upwardly off the tube 19 and out of the cylinder 15. When this ejection of the canister starts the socket 23 is pulled off the pins 25 of the plug 24, the air pipes 61 and 62 are disconnected from the supply pipes 64 and 65 and sharpened blades 57 fitted round the top of the first section 1 of the canister cut through the frangible panel 18 and allow the canister to be ejected clear of the aircraft. Immediately the canister leaves the aircraft it will still have the external form shown in FIGURE 1, and only the cylinder 15 and tube 19 and firing mechanism will remain within the aircraft. Immediately the canister leaves the aircraft it will of course be subject to a heavy deceleration, and while this is taking place the delay cartridge is burning. The length of the delay of this cartridge is set at about 2½ seconds and this ensures that the cartridge does not explode until the speed of the canister has dropped to a level at which the parachute can be deployed without damage.

When this delay has passed and the cartridge 29 fires the gas pressure within the tube 27 acts on the end 35 of the plunger 33 and moves this upwardly into a position such that the end 35 comes into contact with the bottom of the sleeve 36. This movement of the plunger rocks the lever comprising the arms 38 and 40, and thus moves the stud 41 away from the operating member 70 of the microswitch 71 so that the switch closes and causes the batteries to be connected to the transmitter so that this is switched on. Rocking of the lever also moves the rods 43 so that the needles 44 puncture the seals 45 at the necks of the respective compressed gas bottles 10''. The compressed gas, which can conveniently be Freon, then flows through the passages in the mounting block 46 into the flotation bags 13 and 14 to start the inflation of these.

As soon as the plunger 33 has moved its full distance the pressure within the tube 27 reacts against the cartridge 29 and thus forces the tube 27, together with the associated tube 26 and the removable cover section 4 away from the section 3. The force of the explosion is sufficient to shear the rivets 60 and the cover 4 then falls away as shown in FIGURE 2. When the cover separates the part 55 is removed from the aerial 56 so that this starts to erect itself to the transmitting position, and the horseshoe shackle 53 moves to the position shown in FIGURE 2 so that the parachute is drawn out of the cover. FIGURE 2 shows the canister shortly after the firing of the delay cartridge and it will be seen that the aerial 56 is half erected, the parachute is being deployed, and the flotation bags 13 and 14 are in the process of being inflated.

FIGURE 3 shows the recorder unit at a later stage during its fall, and it will be seen that in this figure the parachute is fully deployed and the removable cover section 4 of the canister has been completely jettisoned from the rest of the canister. The aerial 56 is fully erected, and the two flotation bags are fully inflated. If the capsule lands in water in this condition the flotation bags give it sufficient buoyancy to keep afloat until it is picked up. Contact of the soluble bags of sea marker dye with the water causes the water to be stained and thus enables the canister to be sighted more readily. If the canister falls on land the arrangement of the flotation bags in a form of a conical collar around the end of the canister ensures that if the canister lands on its side the part from which the aerial projects will always point upwards so that full erection of the antenna is always permitted.

Although the flotation bags are provided the canister is actually designed so that it is buoyant in itself and thus if either of the bags are punctured or fail to inflate for some reason then the canister can still be recovered from the water.

I claim:
1. In combination:
   an aircraft crash recorder unit including a buoyant canister which is ejectable from an aircraft, the contents of said canister being on a common support and comprising:
   a recorder;
   a time delay mechanism initiated by ejection from the aircraft;
   a parachute including a release linked to said delay mechanism;
   a flotation bag positioned on said cannister so as to insure upright attitude flotation in water and at least partially upright attitude on land;
   a source of compressed gas connected to said bag;
   release means linking said source and said delay mechanism;
   a radio transmitter;
   a switch linked to said delay mechanism for controlling said transmitter;
   an automatically extensible antenna for said transmitter linked to said delay mechanism;
   the linkages being operable only when the delay is complete to deploy said parachute, inflate said flotation bag, switch on said transmitter and extend said antenna

2. An aircraft crash recorder unit as defined by claim 1 in which said time delay mechanism comprises a delay cartridge which is fired by the force of the ejection.

3. An aircraft crash recorder according to claim 2 including;
   a cylinder housing said time delay cartridge;
   a plunger slidably mounted in said cylinder, one end of said plunger projecting from said cylinder;
   and a pivoted lever one arm of which contacts said plunger and the other arm of which contacts said switch controlling said transmitter and said release means for said source of compressed gas.

4. An aircraft crash recorder unit as defined by claim 3 and including:
   a removable cover defining a parachute compartment at one end of the unit, said cover being connected to said cylinder;

and stop means positioned in the path of said plunger for stopping movement of said plunger following switching on one of said transmitter and release of said compressed gas source, whereby the pressure in said cylinder reacts against said cylinder to force it and said removable cover off the remainder of the unit permitting said parachute to deploy.

5. An aircraft crash recorder unit as defined by claim 4 in which said removable cover includes a part covering said extensible antenna for said transmitter so that when said cover is removed, said antenna is extended to an erect position.

References Cited by the Examiner
UNITED STATES PATENTS

| 2,519,553 | 8/50 | Faulkner | 244—1 X |
| 2,759,693 | 8/56 | Gross | 244—138 |
| 2,992,793 | 7/61 | Devantier | 244—1 |
| 3,140,847 | 7/64 | Ames | 244—1 X |

FOREIGN PATENTS

| 2,203,021 | 7/57 | France. |

FERGUS S. MIDDLETON, *Primary Examiner.*

RALPH D. BLAKESLEE, MILTON BUCHLER,
*Examiners.*